US012641056B2

(12) United States Patent
Kim

(10) Patent No.: US 12,641,056 B2
(45) Date of Patent: May 26, 2026

(54) APPARATUS AND METHOD FOR ENHANCING SECURITY OF IN-VEHICLE COMMUNICATION NETWORK

(71) Applicant: HL MANDO CORPORATION, Pyeongtaek-si (KR)

(72) Inventor: Sewon Kim, Pyeongtaek-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 18/806,036

(22) Filed: Aug. 15, 2024

(65) Prior Publication Data

US 2025/0310299 A1     Oct. 2, 2025

(30) Foreign Application Priority Data

Mar. 26, 2024     (KR) ........................ 10-2024-0040781

(51) Int. Cl.
*H04L 9/40*          (2022.01)

(52) U.S. Cl.
CPC ........ *H04L 63/0209* (2013.01); *H04L 63/104* (2013.01)

(58) Field of Classification Search
CPC .......................... H04L 63/0209; H04L 63/104
See application file for complete search history.

(56) References Cited

U.S. PATENT DOCUMENTS

| | | | |
|---|---|---|---|
| 12,192,753 B2 * | 1/2025 | Zaus ................. | H04W 36/0005 |
| 2019/0173862 A1 * | 6/2019 | Kim ........................ | H04L 9/083 |
| 2021/0306204 A1 * | 9/2021 | Park ........................ | H04L 67/51 |
| 2024/0283777 A1 * | 8/2024 | Min ...................... | H04L 9/3271 |
| 2025/0023923 A1 * | 1/2025 | Takai .................... | H04L 65/102 |

* cited by examiner

*Primary Examiner* — J. Brant Murphy
(74) *Attorney, Agent, or Firm* — Studebaker Brackett PLLC

(57) ABSTRACT

The present disclosure relates to an apparatus and method for enhancing the security of an in-vehicle communication network, and includes a memory containing at least one instruction; and at least one processor for executing the at least one instruction stored in the memory, wherein the at least one processor is configured to group a plurality of ECUs (electronic control units) equipped in a vehicle into a plurality of groups, and complete the grouping by including a gateway in each of the plurality of groups, and wherein among the gateways, a transmitting-side gateway is configured to apply a penalty to an ECU that requested the transmission of an unapproved message. The present disclosure can be applied to other embodiments as well.

14 Claims, 3 Drawing Sheets

APPARATUS AND METHOD FOR ENHANCING SECURITY OF IN-VEHICLE COMMUNICATION NETWORK

CROSS-REFERENCE TO RELATED APPLICATION

This application claims priority to and the benefit of Korean Patent Application No. 10-2024-0040781, filed on Mar. 26, 2024, the disclosure of which is incorporated herein by reference in its entirety.

TECHNICAL FIELD

The present disclosure relates to an apparatus and method for enhancing the security of an in-vehicle communication network.

BACKGROUND OF THE INVENTION

As Internet communication technology continues to develop, various Internet communication technologies are being applied to vehicles. To this end, an electronic control unit (ECU), an electronic control device that supports various functions, is mounted in a vehicle. A plurality of such ECUs are distributed and arranged inside a vehicle as needed.

Since ECUs distributed and arranged in a vehicle operate organically with each other, it is necessary to recognize each other's state through basic communication, so a plurality of ECUs arranged in the vehicle are connected through a vehicle network such as CAN (controller area network) communication. For example, ECUs are currently provided for each function of controlling a vehicle, such as an engine, a powertrain, and a body. And each ECU performs a CAN communication network with each other, and the CAN communication network is connected to one gateway to transmit and receive messages between ECUs through the gateway.

However, in the current CAN communication network method, all CAN communication networks are connected to one gateway regardless of the importance of security. Therefore, when a hacking occurs in an ECU that has a relatively low security level and is physically accessible compared to other ECUs, there is a problem in that it is possible to access ECUs with a high security level or physically difficult to access. As a result, it can lead to fatal and serious consequences for the driver's safety, and illegal data tuning and modification can occur in some ECUs, so the need to develop highly reliable security technology is emerging.

SUMMARY OF THE INVENTION

Technical Problem

Embodiments of the present disclosure to solve these conventional problems are directed to providing an apparatus and method for enhancing security of an in-vehicle communication network by grouping a plurality of ECUs controlling a vehicle based on security importance and physical access difficulty and assigning a gateway to each group.

In addition, the embodiments of the present disclosure are directed to providing an apparatus and method for enhancing security of an in-vehicle communication network by setting an approval list with an ID corresponding to a message that can be generated by an ECU included in each group, and if it is confirmed that at least one ECU attempts to transmit a message assigned with an ID other than the ID included in the set approval list, applying a penalty to the corresponding ECU.

Technical Solution

An electronic apparatus for enhancing security of an in-vehicle communication network according to an exemplary embodiment of the present disclosure may include a memory containing at least one instruction; and at least one processor for executing the at least one instruction stored in the memory, wherein the at least one processor is configured to group a plurality of ECUs (electronic control units) equipped in a vehicle into a plurality of groups, and complete the grouping by including a gateway in each of the plurality of groups, and wherein among the gateways, a transmitting-side gateway is configured to apply a penalty to an ECU that requested the transmission of an unapproved message.

In addition, the processor may be configured to group the plurality of ECUs into the plurality of groups based on security importance and physical access difficulty for each of the plurality of ECUs.

In addition, the processor may be configured to assign an ID according to a type of message that can be generated by each of the at least one ECU included in each of the groups.

In addition, the processor may be configured to set an approval list based on the ID.

In addition, the processor may be configured to transmit information on the approval list to the gateway included in each of the groups.

In addition, the transmitting-side gateway may be configured to check, among a plurality of ECUs included in the group comprising the transmitting-side gateway, whether an ID of a message received from at least one ECU is an ID included in the approval list.

In addition, the transmitting-side gateway may be configured to check, if the received message ID is an unapproved ID that is not included in the approval list, the number of message transmission attempts in the ECU that requested to transmit the unapproved message.

In addition, the transmitting-side gateway may be configured to, if the number of attempts exceeds a threshold, control the communication speed of the ECU that requested the transmission of the unapproved message and transmit a warning message to a gateway other than the transmitting-side gateway.

Furthermore, a method for enhancing security of in-vehicle communication network according to an exemplary embodiment of the present disclosure may include grouping, by a processor, a plurality of ECUs equipped in a vehicle into a plurality of groups; completing, by the processor, the grouping by including a gateway in each of the plurality of groups; and applying, by a transmitting-side gateway among the gateways, a penalty to an ECU that requested the transmission of an unapproved message.

In addition, the completing the grouping may include checking security importance and physical access difficulty for each of the plurality of ECUs; and grouping the plurality of ECUs into the plurality of groups based on the security importance and physical access difficulty.

In addition, the method may further include, after the grouping the plurality of ECUs, assigning, by the processor, an ID according to a type of message that can be generated by each of the at least one ECU included in each of the groups; and setting, by the processor, an approval list based on the assigned ID.

In addition, the method may further include transmitting, by the processor, information on the approval list to the gateway included in each of the groups.

In addition, the applying a penalty may include checking, by the transmitting-side gateway, among a plurality of ECUs included in the group comprising the transmitting-side gateway, whether an ID of a message received from at least one ECU is an ID included in the approval list; and checking, by the transmitting-side gateway, if the received message ID is an unapproved ID that is not included in the approval list, the number of message transmission attempts in the ECU that requested to transmit the unapproved message.

In addition, the applying a penalty may include, if the number of attempts exceeds a threshold, controlling, by the transmitting-side gateway, the communication speed of the ECU that requested the transmission of the unapproved message and transmitting a warning message to a gateway other than the transmitting-side gateway.

Advantageous Effects

As described above, the apparatus and method for enhancing security of an in-vehicle communication network according to the present disclosure can realize the security enhancement of the in-vehicle communication network by grouping a plurality of ECUs controlling a vehicle based on security importance and physical access difficulty and assigning a gateway to each group.

In addition, the apparatus and method for enhancing security of an in-vehicle communication network according to the present disclosure can strengthen the response to security threats by setting an approval list with an ID corresponding to a message that can be generated by an ECU included in each group, and if it is confirmed that at least one ECU attempts to transmit a message assigned with an ID other than the ID included in the set approval list, applying a penalty to the corresponding ECU.

DETAILED DESCRIPTION OF THE EMBODIMENTS

Figure 1:
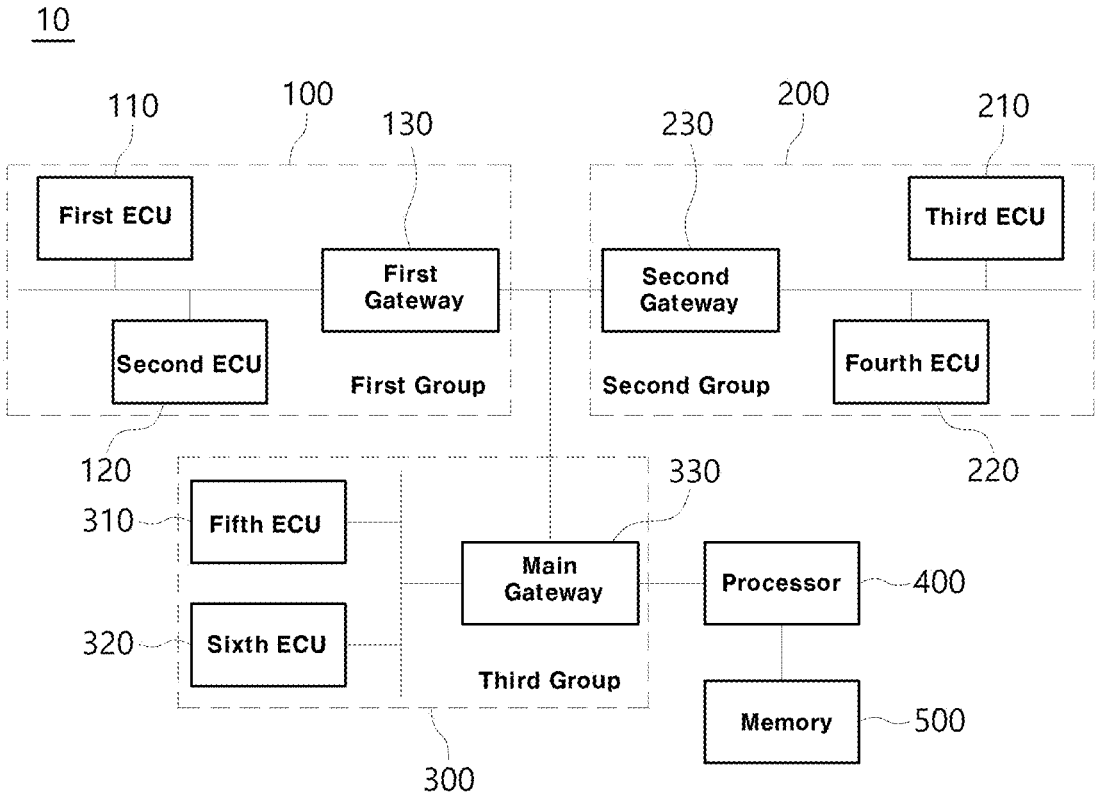
FIG. 1 is a diagram illustrating the main configuration of an electronic apparatus for enhancing the security of an in-vehicle communication network according to an exemplary embodiment of the present disclosure.

Hereinafter, preferred embodiments according to the present disclosure will be described in detail with reference to the accompanying drawings. The detailed description to be disclosed hereinafter with the accompanying drawings is intended to describe exemplary embodiments of the present disclosure and is not intended to represent the only embodiments in which the present disclosure may be implemented. In the drawings, parts unrelated to the description may be omitted for clarity of description of the present disclosure, and like reference numerals may designate like elements throughout the specification.

FIG. 1 is a diagram illustrating the main configuration of an electronic apparatus for enhancing the security of an in-vehicle communication network according to an exemplary embodiment of the present disclosure.

Referring to FIG. 1, the electronic apparatus 10 according to the present disclosure may include a first group 100, a second group 200, a third group 300, a processor 400, and a memory 500. In this case, the first group 100 to the third group 300 may be formed based on the security importance and physical access difficulty of a plurality of ECUs (electronic control units) mounted inside a vehicle.

For example, the first group 100 may include a first ECU 110 and a second ECU 120, and the second group 200 may include a third ECU 210 and a fourth ECU 220, and the third group 300 may include a fifth ECU 310 and a sixth ECU 320. Each group can be formed by grouping ECUs with the same or similar security importance and the same or similar physical access difficulty.

In this case, ECU may refer to various modules that control apparatuses that perform various functions in a vehicle, such as an engine control module (ECM), a powertrain control module (PCM), a transmission control module (TCM), a brake control module (BCM), a body control module (BCM), a suspension control module (SCM), and an airbag control module (ACM). In addition, the number of groups and the number of ECUs included in each group are for convenience of explanation and are not necessarily limited thereto.

In addition, the first group 100 and the second group 200 may include a first gateway 130 and a second gateway 230, which are sub-gateways, respectively, and the third group 300 may include a main gateway 330. In this case, the fifth ECU 310 and the sixth ECU 320 included in the third group 300 may be ECUs having the highest security importance and physical access difficulty among a plurality of ECUs equipped in the vehicle, and may be ECUs having higher security importance and physical access difficulty than ECUs included in the first group 100 or the second group 200.

In addition, the ECUs 110 and 120 included in the first group 100 and the first gateway 130, the ECUs 210 and 220 included in the second group 200 and the second gateway 230, and the ECUs 310 and 320 included in the third group 300 and the main gateway 330 may perform CAN communication. In addition, the first gateway 130 and the second gateway 230 may perform CAN communication, and the first gateway 130 and the second gateway 230 may perform CAN communication with the main gateway 330.

The processor 400 groups a plurality of ECUs equipped inside the vehicle according to a grouping request signal received from the outside. In this case, the grouping request signal may be a signal input from an operator before or after the vehicle is shipped.

The processor 400 checks security importance and physical access difficulty for each of a plurality of ECUs equipped inside the vehicle, and groups ECUs having the same or similar security importance and physical access difficulty. For example, the processor 400 may group the first ECU 110 and the second ECU 120 into the first group 100, group the third ECU 210 and the fourth ECU 220 into the second group 200, and group the fifth ECU 310 and the sixth ECU 320 into the third group 300. In this case, the processor 400 may assign gateways to the first group 100, the second group 200, and the third group 300, respectively, so that each group includes a gateway and an ECU. For example, the processor 400 may set the first group 100 and the second group 200 to include the first gateway 130 and the second gateway 230, which are sub-gateways, respectively, and may set the third group 300 to include the main gateway 330.

The processor 400 assigns an identifier (ID) to each of at least one ECU included in each group 100, 200, and 300 according to the type of message that can be generated. For example, the processor 400 may assign A and B as IDs to the types of messages that can be generated by the first ECU 110 included in the first group 100, and may assign C as an ID to the type of message that can be generated by the second ECU 120. The processor 400 may assign D, E and F as IDs to the types of messages that can be generated by the third ECU 210 included in the second group 200, and may assign G and H as IDs to the types of messages that can be generated by the fourth ECU 220. The processor 400 may assign I and J as IDs to the types of messages that can be generated by the fifth ECU 310, and may assign K, L and M as IDs to the types of messages that can be generated by the sixth ECU 320.

The processor 400 sets an approval list including the IDs of messages that can be generated by the ECU included in each group. The processor 400 transmits group information including the set approval list to the main gateway 330 and stores the group information in the memory 500. The main gateway 330 may load the group information received from the processor 400 onto a CAN bus, which is a CAN communication line, and transmit the group information to the first gateway 130 and the second gateway 230. In addition, the processor 400 may perform CAN communication with the main gateway 330 and may perform communication such as universal asynchronous receiver/transmitter (UART).

In this case, the group information may be information related to the inclusion of the first ECU 110, the second ECU 120, and the first gateway 130 in the first group 100, the inclusion of the third ECU 210, the fourth ECU 220, and the second gateway 230 in the second group 200, and the inclusion of the fifth ECU 310, the sixth ECU 320, and the main gateway 330 in the third group 300.

The memory 500 may store types of a plurality of ECUs equipped in the vehicle, and security importance and physical access difficulty for the ECUs. The memory 500 may store types of messages that may be generated in each ECU. In addition, the memory 500 may store group information including an approval list generated by the processor 400.

Figure 2:
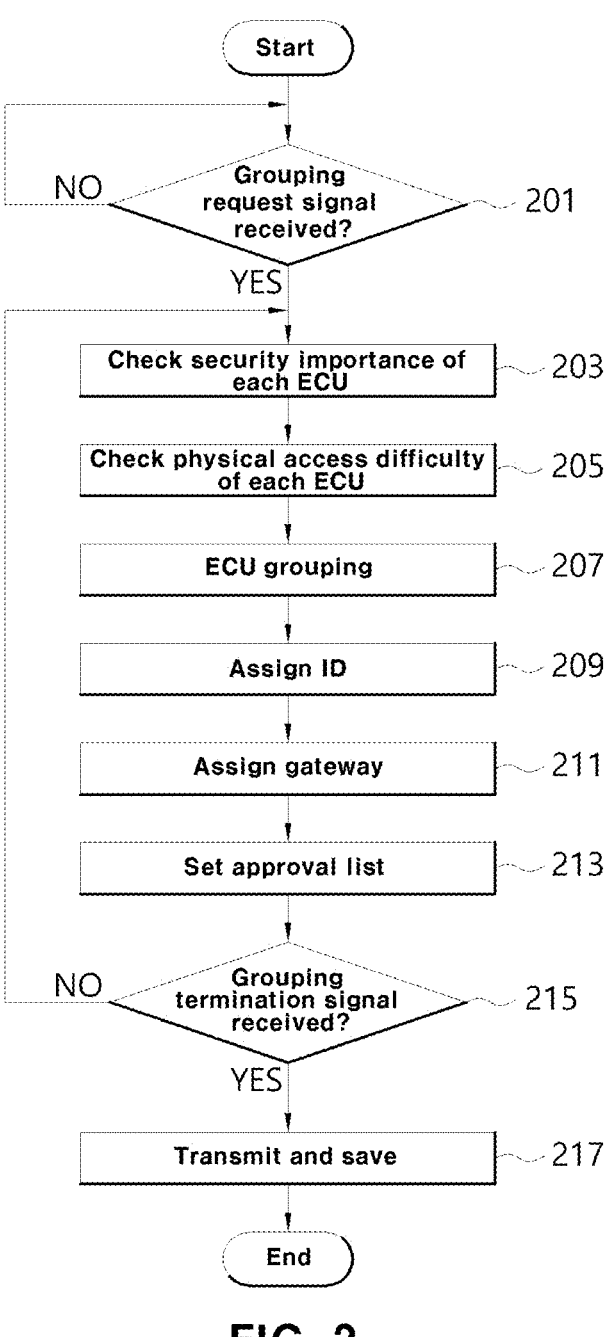
FIG. 2 is a flowchart illustrating a method of grouping ECUs inside a vehicle to enhance the security of an in-vehicle communication network according to an exemplary embodiment of the present disclosure.

FIG. 2 is a flowchart illustrating a method of grouping ECUs inside a vehicle to enhance the security of an in-vehicle communication network according to an exemplary embodiment of the present disclosure.

Referring to FIG. 2, in step 201, the processor 400 checks whether a grouping request signal is received from the outside. In this case, the grouping request signal may be a signal input from an operator before or after the vehicle is shipped. As a result of checking in step 201, if the grouping request signal is received, the processor 400 may perform step 203, and if the grouping request signal is not received, the processor 400 may wait for the reception of the corresponding signal.

In step 203, the processor 400 checks the security importance of a plurality of ECUs equipped inside the vehicle, and in step 205, the processor 400 checks the physical access difficulty of each ECU. In this case, ECU (electronic control unit) may refer to various modules that control apparatuses that perform various functions in a vehicle, such as an engine control module (ECM), a powertrain control module (PCM), a transmission control module (TCM), a brake control module (BCM), a body control module (BCM), a suspension control module (SCM), and an airbag control module (ACM).

In step 207, the processor 400 performs grouping of ECUs based on the security importance and physical access difficulty identified in steps 203 and 205. For example, as shown in FIG. 1, the processor 400 may group the first ECU 110 and the second ECU 120 into the first group 100, group the third ECU 210 and the fourth ECU 220 into the second group 200, and group the fifth ECU 310 and the sixth ECU 320 into the third group 300. In this case, the number of groups and the number of ECUs included in each group are for convenience of explanation and are not necessarily limited thereto. In addition, the processor 400 may form a group of ECUs with the same or similar security importance and the same or similar physical access difficulty.

In step 209, the processor 400 assigns an ID to each of at least one ECU included in each group 100, 200, and 300 according to the type of message that can be generated. To this end, the processor 400 may check the types of messages that may be generated in each ECU stored in the memory 500, and assign IDs to each type of messages.

For example, the processor 400 may assign A and B as IDs to the types of messages that can be generated by the first ECU 110 included in the first group 100, and may assign C as an ID to the type of message that can be generated by the second ECU 120. The processor 400 may assign D, E and F as IDs to the types of messages that can be generated by the third ECU 210 included in the second group 200, and may assign G and H as IDs to the types of messages that can be generated by the fourth ECU 220. The processor 400 may assign I and J as IDs to the types of messages that can be generated by the fifth ECU 310, and may assign K, L and M as IDs to the types of messages that can be generated by the sixth ECU 320.

In step 211, the processor 400 assigns gateways to the first group 100, the second group 200, and the third group 300, respectively, and sets the gateways included in the group. For example, the processor 400 may set the first group 100 and the second group 200 to include the first gateway 130 and the second gateway 230, which are sub-gateways, respectively, and may set the third group 300 to include the main gateway 330. In this case, the fifth ECU 310 and the sixth ECU 320 included in the third group 300 may be ECUs having the highest security importance and physical access difficulty among a plurality of ECUs equipped in the vehicle, and may be ECUs having higher security importance and physical access difficulty than ECUs included in the first group 100 or the second group 200.

In step 213, the processor 400 sets an approval list including the IDs of messages that can be generated by the ECU included in each group.

In step 215, if a grouping termination signal is not received, the processor 400 may return to step 203 and re-perform steps 203 to 213. In step 215, if the grouping termination signal is received, the processor 400 performs step 217 to transmit group information including the approval list to the main gateway 330 and store the group information in the memory 500.

The main gateway 330 receiving the group information from the processor 400 may load the group information onto a CAN bus, which is a CAN communication line, and transmit the group information to the first gateway 130 and the second gateway 230. The group information may be information related to the inclusion of the first ECU 110, the second ECU 120, and the first gateway 130 in the first group 100, the inclusion of the third ECU 210, the fourth ECU 220, and the second gateway 230 in the second group 200, and the inclusion of the fifth ECU 310, the sixth ECU 320, and the main gateway 330 in the third group 300. In this case, the group information is shown in Table 1 below.

TABLE 1

| Group Name | ECU Name | Gateway Name | Approval List |
|---|---|---|---|
| first group | first ECU second ECU | first gateway | A, B C |
| second group | third ECU fourth ECU | second gateway | D, E, F G, H |
| third group | fifth ECU sixth ECU | main gateway | I, J K, L, M |

Figure 3:
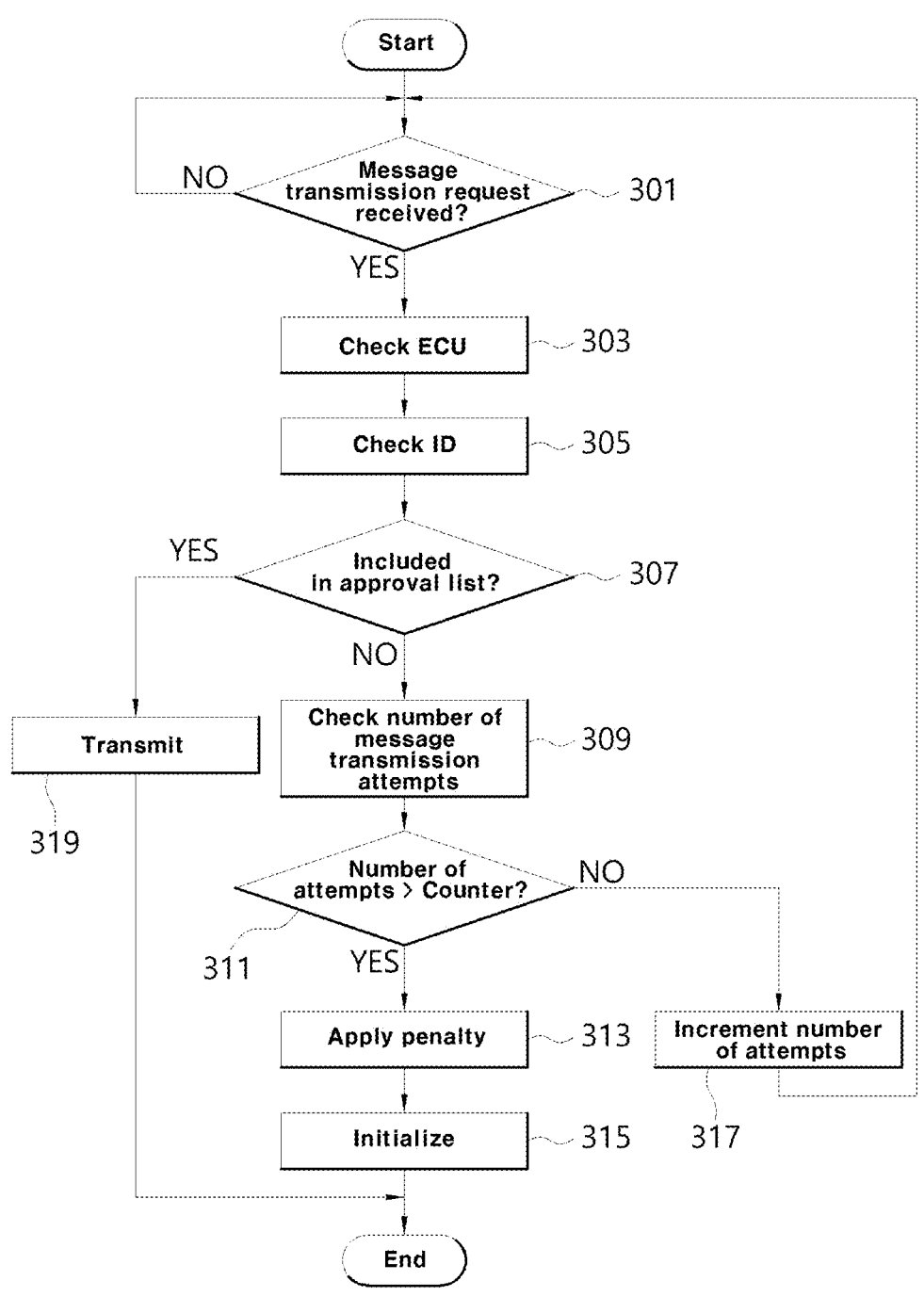
FIG. 3 is a flowchart illustrating a method for enhancing the security of an in-vehicle communication network according to an exemplary embodiment of the present disclosure.

FIG. 3 is a flowchart illustrating a method for enhancing the security of an in-vehicle communication network according to an exemplary embodiment of the present disclosure. In an embodiment of the present disclosure, this is to explain a method for enhancing the security of a communication network based on the first group 100, and it is clarified that the method of FIG. 3 may also be applied to the second group 200 and the third group 300.

Referring to FIG. 3, in step 301, the first gateway 130, that is, the transmitting-side gateway, if a message transmission request signal is received from at least one of the first ECU 110 and the second ECU 120 included in the first group 100, performs step 303, and waits for the message transmission request signal to be received if the message transmission request signal is not received.

In step 303, the first gateway 130 checks the ECU that requested message transmission. For example, the first gateway 130 may confirm that the ECU that requested message transmission is the first ECU 110. In this case, the first ECU 110 may transmit a transmission message by assigning an ID according to the type of the transmission message to the Tx (transceiver) area in the frame of the transmission message to be transmitted.

In step 305, the first gateway 130 checks the ID assigned to the Tx area of the transmission message for the message transmission request. In step 307, the first gateway 130 checks the approval list from the group information transmitted in step 217 of FIG. 2, and checks whether the ID assigned to the transmission message is included in the confirmed approval list.

As a result of checking in step 307, if the ID assigned to the transmission message is included in the approval list, it performs step 319, and if the ID assigned to the transmission message is not included in the approval list, it performs step 309. In step 319, the first gateway 130 may load the transmission message onto a CAN bus, which is a CAN communication line, and transmit the transmission message. Through this, the transmission message may be received by the second ECU 120 included in the first group 100 and may be received by an ECU included in the second group 200 or the third group 300.

In step 309, the first gateway 130 checks the number of message transmission attempts attempted by the first ECU 110 to transmit a message. In step 311, the first gateway 130 performs step 313 if it is confirmed that the number of message transmission attempts exceeds a counter, that is, a threshold. Conversely, in step 311, if the number of message transmission attempts is less than or equal to a counter, the first gateway 130 performs step 317 to increase the number of attempts and return to step 301.

In step 313, the first gateway 130 applies a penalty to the first ECU 110. Here, the penalty may mean lowering the communication speed at the first ECU 110 or limiting the access of the CAN bus from the first ECU 110 to the first gateway 130, and transmitting a security warning to the gateways 230 and 330 included in the second group 200 and the third group 300 indicating that the first ECU 110 has been hacked. Accordingly, if the first ECU 110 is hacked from an external device (not shown) and transmits a message not included in the approval list through the first ECU 110, the security of the in-vehicle communication network may be enhanced by applying a penalty to the first ECU 110.

The embodiments of the present disclosure disclosed in the present specification and drawings are only provided as specific examples to easily describe the technical content of the present disclosure and to aid understanding of the present disclosure, and are not intended to limit the scope of the present disclosure. Therefore, the scope of the present disclosure should be construed that all changes or modifications derived based on the technical idea of the present disclosure in addition to the embodiments disclosed herein are included in the scope of the present disclosure.

What is claimed is:

1. An electronic apparatus, comprising:
a memory containing at least one instruction; and
at least one processor for executing the at least one instruction stored in the memory,
wherein the at least one processor is configured to:
group a plurality of ECUs (electronic control units) equipped in a vehicle into a plurality of groups; and
complete the grouping by including gateways in the plurality of groups,
wherein each of the gateways corresponds to a respective one of the plurality of groups, and
wherein among the gateways, a transmitting-side gateway is configured to apply a penalty to an ECU that requested a transmission of an unapproved message.

2. The electronic apparatus of claim 1,
wherein the processor is configured to:
group the plurality of ECUs into the plurality of groups based on security importance and physical access difficulty for each of the plurality of ECUs.

3. The electronic apparatus of claim 2,
wherein the processor is configured to:
assign an ID (identifier) according to a type of message that can be generated by each of the at least one ECU included in each of the groups.

4. The electronic apparatus of claim 3,
wherein the processor is configured to:
set an approval list based on the ID.

5. The electronic apparatus of claim 4,
wherein the processor is configured to:
transmit information on the approval list to the gateway included in each of the groups.

6. The electronic apparatus of claim 5,
wherein the transmitting-side gateway is configured to:
check, among a plurality of ECUs included in the group comprising the transmitting-side gateway, whether an ID of a message received from at least one ECU is an ID included in the approval list.

7. The electronic apparatus of claim 6,
wherein the transmitting-side gateway is configured to:
check, if the received message ID is an unapproved ID that is not included in the approval list, the number of message transmission attempts in the ECU that requested to transmit the unapproved message.

8. The electronic apparatus of claim 7, wherein the transmitting-side gateway is configured to:

if the number of attempts exceeds a threshold, control the communication speed of the ECU that requested the transmission of the unapproved message and transmit a warning message to a gateway other than the transmitting-side gateway.

9. A method for enhancing security of in-vehicle communication network, comprising:

grouping, by a processor, a plurality of ECUs equipped in a vehicle into a plurality of groups;

completing, by the processor, the grouping by including gateways in the plurality of groups, wherein each of the gateways corresponds to a respective one of the plurality of groups; and applying, by a transmitting-side gateway among the gateways, a penalty to an ECU that requested a transmission of an unapproved message.

10. The method for enhancing security of in-vehicle communication network of claim 9, wherein the completing the grouping comprises:

checking security importance and physical access difficulty for each of the plurality of ECUs; and grouping the plurality of ECUs into the plurality of groups based on the security importance and physical access difficulty.

11. The method for enhancing security of in-vehicle communication network of claim 10, after the grouping the plurality of ECUs, further comprising:

assigning, by the processor, an ID according to a type of message that can be generated by each of the at least one ECU included in each of the groups; and setting, by the processor, an approval list based on the assigned ID.

12. The method for enhancing security of in-vehicle communication network of claim 11, further comprising:

transmitting, by the processor, information on the approval list to the gateway included in each of the groups.

13. The method for enhancing security of in-vehicle communication network of claim 12, wherein the applying a penalty comprises:

checking, by the transmitting-side gateway, among a plurality of ECUs included in the group comprising the transmitting-side gateway, whether an ID of a message received from at least one ECU is an ID included in the approval list; and checking, by the transmitting-side gateway, if the received message ID is an unapproved ID that is not included in the approval list, the number of message transmission attempts in the ECU that requested to transmit the unapproved message.

14. The method for enhancing security of in-vehicle communication network of claim 13, wherein the applying a penalty comprises:

if the number of attempts exceeds a threshold, controlling, by the transmitting-side gateway, the communication speed of the ECU that requested the transmission of the unapproved message and transmitting a warning message to a gateway other than the transmitting-side gateway.

\* \* \* \* \*